United States Patent [19]

Hisserich

[11] 4,075,996
[45] Feb. 28, 1978

[54] EXTERNAL COMPRESSION IGNITION SYSTEM FOR INTERNAL COMBUSTION ENGINES

[76] Inventor: Charles A. Hisserich, 447 Cabrillo St., Costa Mesa, Calif. 92627

[21] Appl. No.: 646,569

[22] Filed: Jan. 5, 1976

[51] Int. Cl.$^2$ ............................................. F02P 21/00
[52] U.S. Cl. ........................... 123/143 A; 123/32 AE
[58] Field of Search ......... 123/DIG. 9, 143 A, 143 B, 123/144, 32 EF, 32 EA, 32 ST, 32 SP, 141, 191 S, 191 SP, 32 AE, 32 AB, 139 E; 116/137 A; 60/39.82

[56] References Cited

U.S. PATENT DOCUMENTS

| | | | |
|---|---|---|---|
| 1,302,653 | 5/1919 | Goodspeed | 123/143 A |
| 2,148,458 | 2/1939 | Grahman | 123/143 A |
| 2,158,124 | 5/1939 | Honn | 123/143 A |
| 2,829,631 | 4/1958 | Wilt | 123/32 AE UX |
| 3,117,564 | 1/1964 | May | 123/143 A X |
| 3,406,667 | 10/1968 | Evans et al. | 123/143 A X |
| 3,411,045 | 11/1968 | Reyner | 123/32 EF UX |
| 3,433,207 | 3/1969 | Bassot et al. | 123/32 EF X |
| 3,580,231 | 5/1971 | Bradbury | 123/143 A X |
| 3,665,901 | 5/1972 | Monpetit et al. | 123/32 EF |
| 3,853,102 | 12/1974 | Myers et al. | 123/90.11 X |

FOREIGN PATENT DOCUMENTS

| | | | |
|---|---|---|---|
| 397,493 | 2/1932 | United Kingdom | 123/139 E |

*Primary Examiner*—William L. Freeh
*Assistant Examiner*—Michael Koczo, Jr.
*Attorney, Agent, or Firm*—Lawrence Fleming

[57] ABSTRACT

To increase the fuel efficiency and decrease the emissions of current types of internal combustion engines by improving the burning of leaner fuel mixtures, a novel igniter is provided for each combustion chamber of the engine. The igniter comprises a small external chamber into which small charges of auxiliary fuel are valved, mixed with air, and then rapidly compressed to ignition temperature by a miniature piston or ram. From each of these external chambers a small orifice leads to its corresponding engine combustion chamber. The small size of the orifice restricts the exit flow into this engine combustion chamber of the auxiliary air/fuel mixture, permitting effective compression by the rapid action of the ram. The orifice may be so shaped that the limited amount of auxiliary air/fuel mixture which passes through it prior to ignition is ultrasonically mixed and shaped in order to provide, upon ignition, a geographically desirable flame pattern in the engine combustion chamber which effectively ignites the lean main charge. The igniter compression chamber may be of small volume, e.g. 1 cc. Its piston or ram may be actuated by solenoid means with reasonable electric power consumption. Auxiliary fuel may be valved to these chambers by low-pressure electrically actuated fuel injection valves of known type. The system may be manufactured as a retrofit kit for existing engines, in which case the external compression igniter assemblies may be screwed into the spark plug holes as the spark plugs are no longer required.

11 Claims, 12 Drawing Figures

TIMING DIAGRAM

EXTERNAL COMPRESSION IGNITION SYSTEM FOR INTERNAL COMBUSTION ENGINES

BACKGROUND

In the search for greater fuel efficiency and emission reduction in internal combustion engines, as for automobiles, improved means to ignite leaner fuel mixtures and to approach complete combustion are desirable objectives. However, until stringent federal and state legislation was recently passed requiring the automotive industry to reduce emissions, the major emphasis has been placed upon performance rather than emission control and economy. As performance was believed to be related directly to the richness of the fuel mixture, most of these automobiles had air/fuel analyzer readings which were off scale on the rich end, e.g., 10/1 or less at idle and during deceleration.

It is evident that emissions (other than evaporative loss results from faulty combustion of the air/fuel mixture in the engine combustion chamber; hot spots form $NO_x$ (oxides of nitrogen), cold spots form CO (carbon monoxide) and HC (unburned hydrocarbons). Early 1st and 2nd generation measures to reduce emissions required excessive maintenance and degraded performance as exemplified by the many versions of "tailoring" the spark advance curve from idle to road speed. Recently, the trend has favored the use of afterburners, the catalytic converter being the most popular. These 3rd generation devices are essentially clean-up methods which attack the problem "after the fact" that incomplete combustion is occurring in the combustion chamber. The Honda firm of Japan, with their stratified charge engine, has attacked the problem head-on by improving the combustion process. The purpose of this invention is to further improve combustion through the use of a novel ram compression ignition system.

BRIEF SUMMARY

This invention comprises an auxiliary cylinder-like chamber and piston or ram of small size which ignites a charge of air/fuel mixture in the main combustion chamber of an internal combustion engine. The auxiliary chamber receives a metered charge of auxiliary fuel and air and compresses it rapidly in adiabatic fashion to the temperature of ignition. Through a small shaped orifice an air/fuel jet is directed into the main engine combustion chamber just prior to compression ignition, which occurs substantially during the final 10% of travel of the auxiliary piston or ram. Ignition causes the flame to be directed through the orifice and to follow the air/fuel jet into the main combustion chamber of the internal combustion engine, igniting it. The orifice may be so shaped, in the manner of a modified Galton whistle, that it causes the air/fuel jet to oscillate ultrasonically, creating upon ignition a shaped flame which is capable of igniting an appreciably leaner air/fuel mixture than is possible with the usual spark plug. The volume of the auxiliary compression ignition chamber of the invention may be suitably of the order of 1/700 of the volume of the associated main combustion chamber, e.g., 1 $cm^3$ for a 41 $in^3$ cylinder of an 8-cylinder engine of 327 $in^3$.

The ram of the auxiliary chamber may desirably be actuated by an electric solenoid and a portion of the piston or ram may physically be the armature of the solenoid. This solenoid may be powered by suitable solid state circuitry of known type which is programmed from a rotary switch means. The rotary switch may be so constructed as to replace the conventional distributor. The closure time of the auxiliary piston or ram may be of the order of 3 milliseconds or less. Such fast acting solenoids are known. With such rapid operation, a pressure permitting adiabatic ignition may readily be attained in the small auxiliary chamber, e.g., of the order of 600 pounds per square inch (42.19 $kg/cm^2$). Alternatively a glow plug element of known type may be installed adjacent to the exit orifice of the auxiliary chamber in order to permit ignition of auxiliary fuels of lower grades.

Such speed of operation of the auxiliary piston or ram overcomes the loss of pressure from the leakage of the auxiliary air/fuel mixture through the said small restrictive orifice, thus allowing ignition temperature to be reached.

The solenoid-actuated auxiliary igniter assembly with its small cylinder and piston or ram, may be so structured as to be installable in the spark plug hole of each cylinder of a conventional gasoline engine. The auxiliary fuel valves may be mounted on the igniters. The electrical control means may be "bolt-on" accessories comprising electronic power circuitry to drive the ram solenoids and the auxiliary fuel valves to said igniter assemblies, and switching or programming means comprising assemblies replacing the original distributor and rotor.

IN THE DRAWINGS

Figures 3A, 3B, 3C:
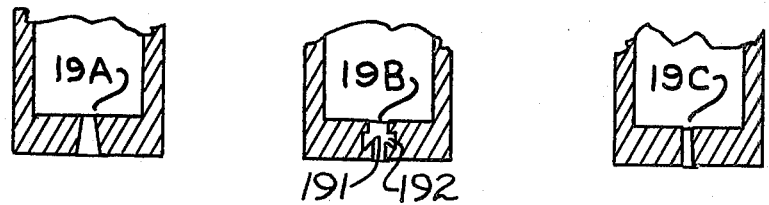
Figures 4A, 4B, 4C:
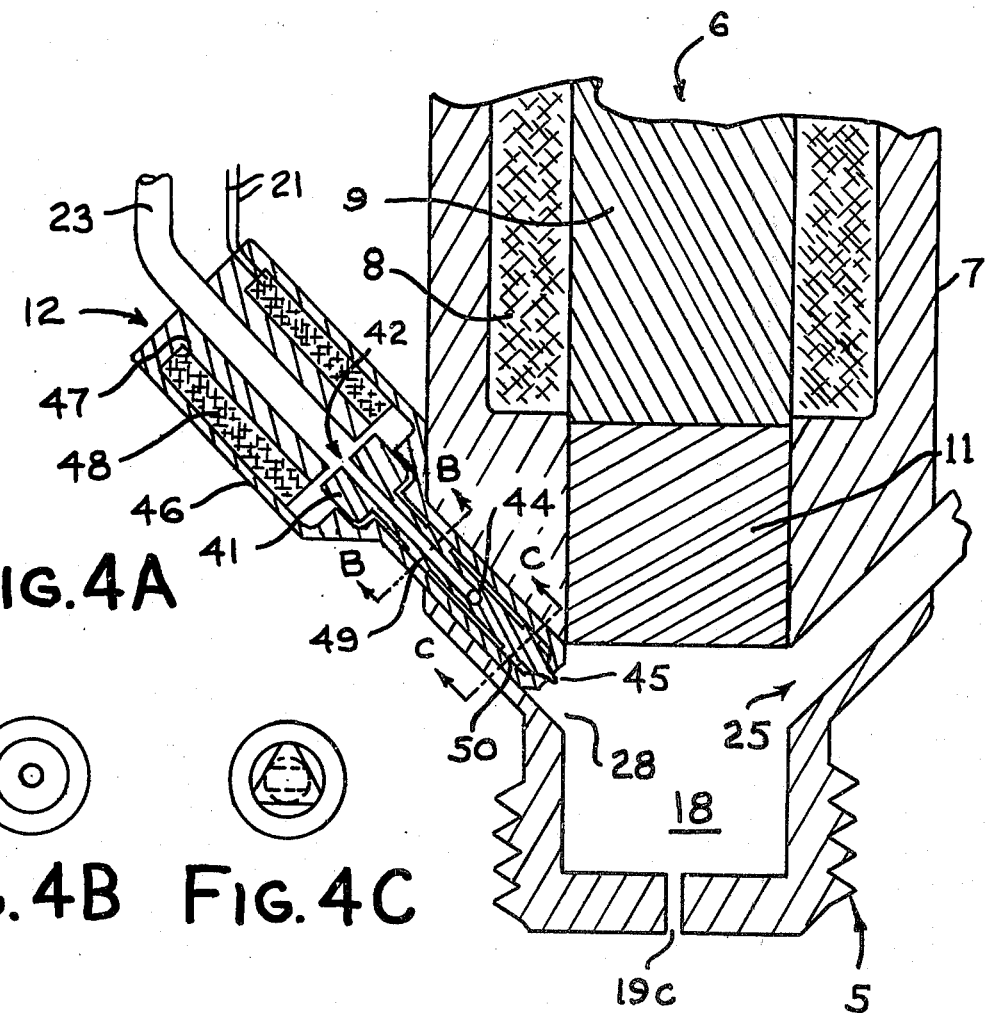
Figure 5:
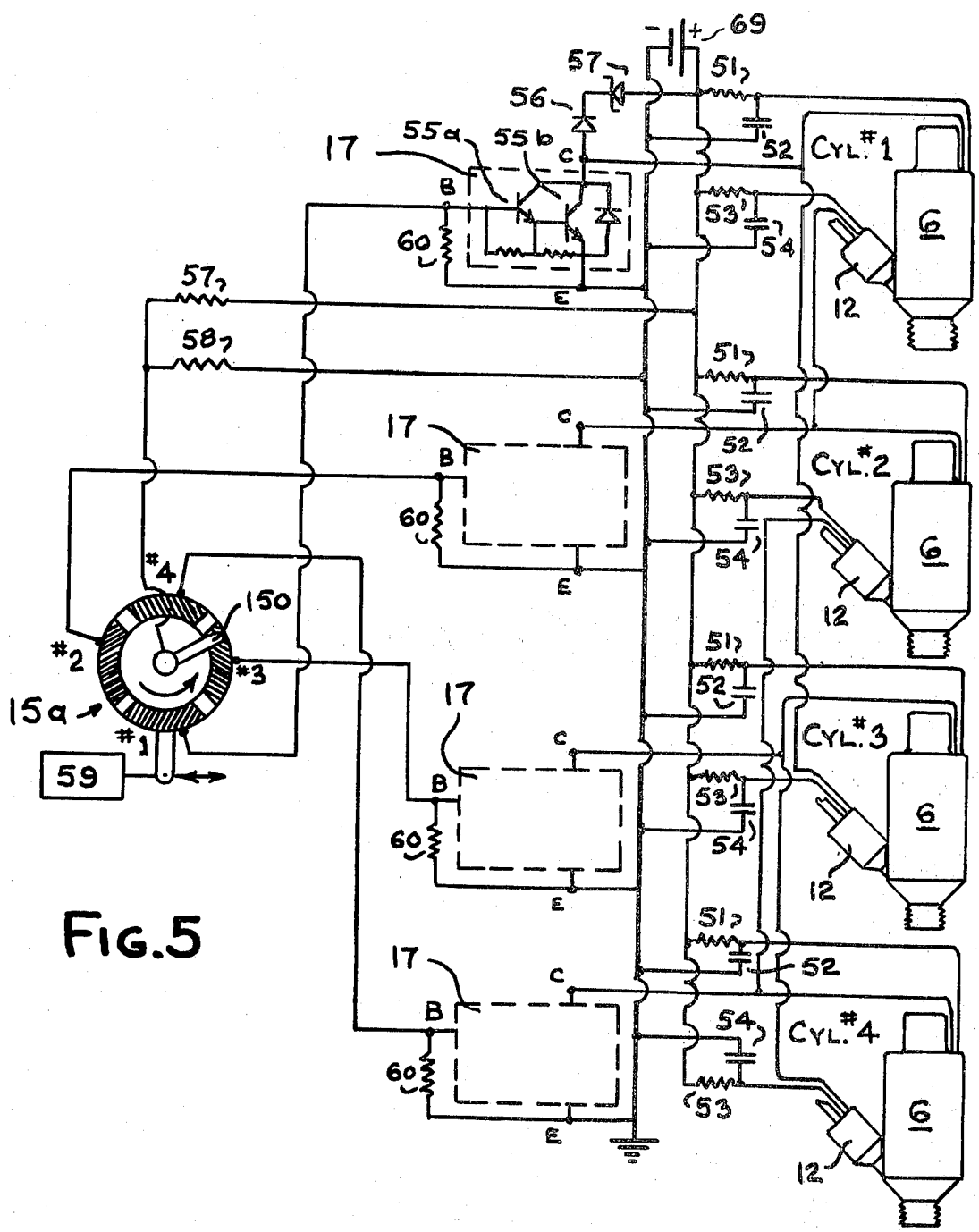
Figure 6:
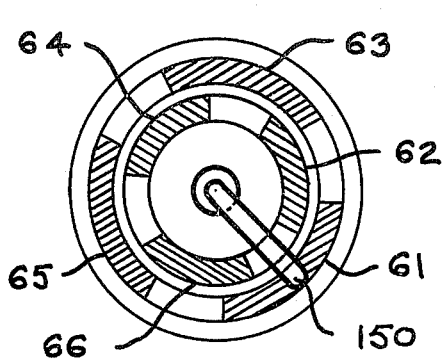
Figure 7:
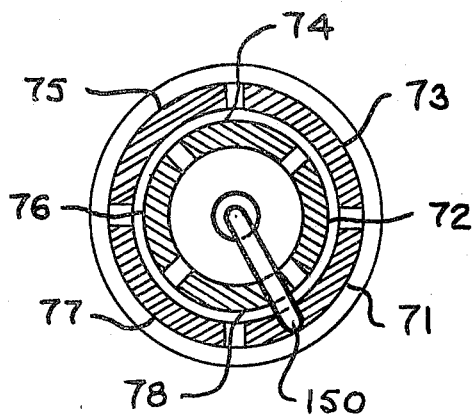
Figure 8:
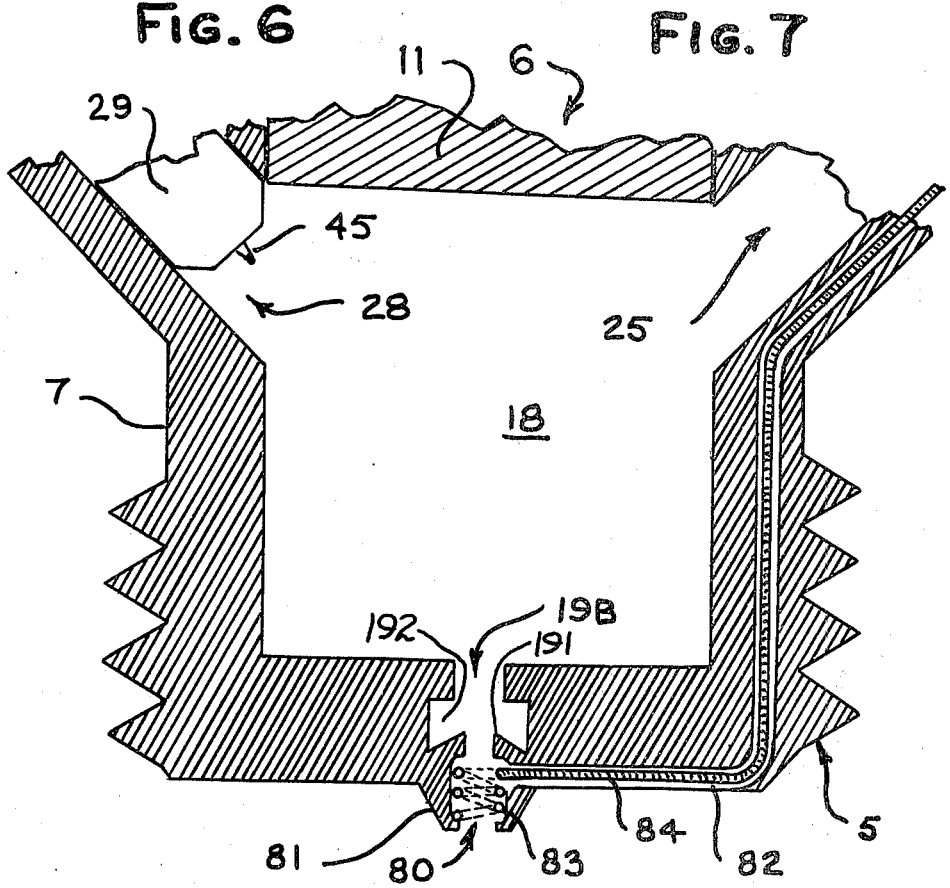

FIGS. 3A, 3B, and 3C are cross-sectional views of orifices;

FIG. 4A is a partial sectional view of a solenoid actuated auxiliary fuel valve installed in an igniter of the invention;

FIGS. 4B and 4C are cross-sectional views of the nose portion of said valve on lures B—B and C—C respectively of FIG. 4;

FIG. 5 is a schematic of an electrical system according to the invention;

FIGS. 6 and 7 are rotary diagrams of distributor programming according to the invention, for six-cylinder and eight-cylinder engines respectively; and FIG. 8 is a partial sectional view of a glow plug element installed on an igniter of the invention.

DETAILED DESCRIPTION

Before referring to the Figures, a distinction will be noted between the ignition means of this invention and that of the Diesel engine. In the Diesel, the air is compressed to the temperature of ignition in the main combustion chamber, at which instant the fuel is injected at a pressure of 450 to 600 pounds per square inch (PSI), from a high-pressure injector which is precisely timed to the engine rotation as the power stroke begins with the injection of fuel. In this invention, the auxiliary fuel is valved into the auxiliary compression chamber by a low-pressure electro-mechanical valve which may operate at a fuel line pressure, e.g., 28 PSI. This auxiliary fuel valve operates during the engine compression stroke in order to charge the auxiliary chamber of the igniter with fuel immediately preceding the engine power stroke. Thus, the programmer is arranged so that a solenoid driver which actuates the compression igniter piston or ram on the engine power stroke of any given cylinder is simultaneously actuating the auxiliary fuel valve on the engine compression stroke of the next cylinder in the firing order. This invention primarily differs from the Diesel in that fuel valving is done at low-pressure and sequence programming of the auxiliary fuel supply valve is provided prior to each engine power stroke.

Herein, the combined term piston or ram is used in order to distinguish it from the engine piston; the piston or ram has two portions, an upper armature which acts as the solenoid plunger, and a non-magnetic lower portion which acts as the ram piston.

Also, the low-pressure electro-mechanical auxiliary fuel valves operate at much lower pressures then do true Diesel injectors, even though they are called "injectors" in the automotive field.

Figure 1:
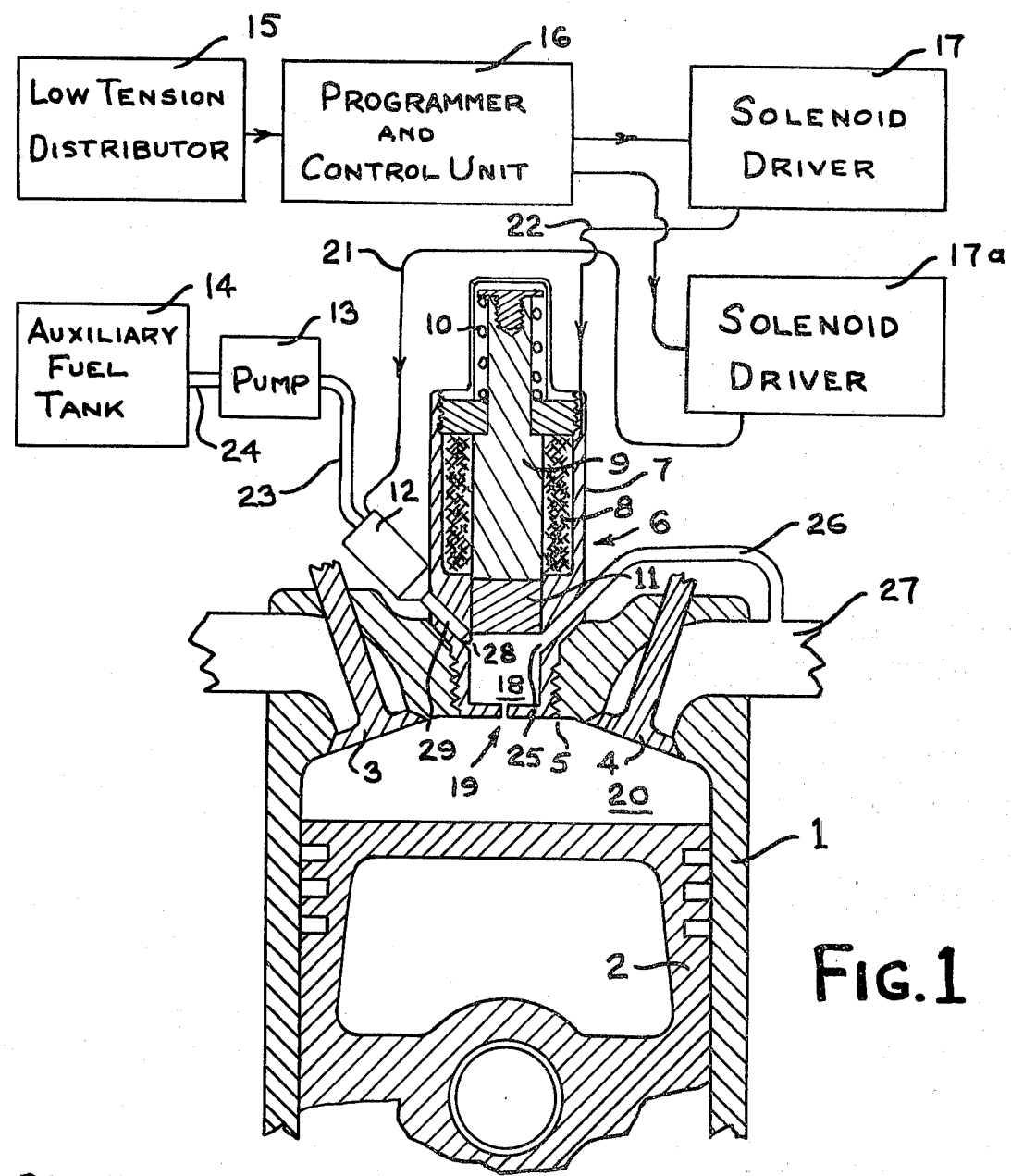
FIG. 1 is a partial diagrammatic cutaway view of one cylinder of an internal combustion engine with an auxiliary compression igniter according to the invention installed in the spark plug hole, and control means shown in block form.

Referring first to FIG. 1, 1 represents a cylinder in a known type of internal combustion engine, 2 the piston, and 3 and 4 the conventional intake and exhaust valves. 5 represents a conventional spark plug hole, and 6 shows generally a solenoid-actuated compression igniter according to the invention, screwed into said hole.

The igniter 6 comprises a case 7, a wire coil winding 8, and an armature 9 which is movable and travels down under the influence of coil 8 and up under the influence of the return spring 10. The lower portion of the armature is a non-magnetic piston 11 which is preferably integral with the armature 9 and completely occupies igniter cylinder space or auxiliary combustion chamber 18 as the armature moves down.

Auxiliary igniter fuel, such as Diesel fuel, is admitted to the igniter cylinder space 18 through port 28 by means of auxiliary fuel valve 12 with nose portion 29. The valve 12 is electrically actuated by an electrical solenoid driver unit 17a during the compression stroke of the engine cylinder 1. The main solenoid winding 8, which actuates the igniter piston or ram 9, 11, is actuated by another solenoid driver unit 17 during the power stroke of this cylinder which occurs later in the Otto cycle (the programming of solenoid drivers will be clarified in the discussion of FIG. 5). The valve 12 may be a low-pressure automotive fuel "injection" valve of known type. Such a valve is shown in more detail in FIGS. 4A, 4B, and 4C.

In FIG. 1, an auxiliary fuel tank 14 and fuel pump 13 supply auxiliary fuel, which may be Diesel fuel or the like, to the auxiliary fuel valve 12, via tubing 23 and 24. The valve 12 is opened and closed electrically via wiring 21 from a solenoid driver unit 17a which may employ electronic circuitry of the solid-state type shown in detail in FIG. 5.

FIG. 1 shows in block from a low-tension distributor 15 and a programmer and control unit 16, which may be mounted in a common housing. The low-tension distributor may take the form of a rotating switch, in the manner of the timer used on Model T Ford cars. Such a distributor is shown schematically in FIG. 5 for a four cylinder engine. For engines of 6 or 8 cylinders, a dual set of stationary contacts is required. These forms are shown schematically in FIGS. 6 and 7. The programmer and control unit 16 is arranged to accommodate interconnections from the low-tension distributor to the solenoid drivers 17 for the various firing orders now in use on four, six, and eight-cylinder engines. It also contains electronic components which control the shape and duration of the actuation current applied to the auxiliary fuel valve coils 48 (FIG. 4A) and ram igniter coils 8 (FIG. 1).

In FIG. 1, the igniter further comprises a small exhaust port 25 connecting with a tube 26 which leads to the exhaust system indicated at 27, valve 4 being an exhaust valve and valve 3 an intake valve.

Figure 2:
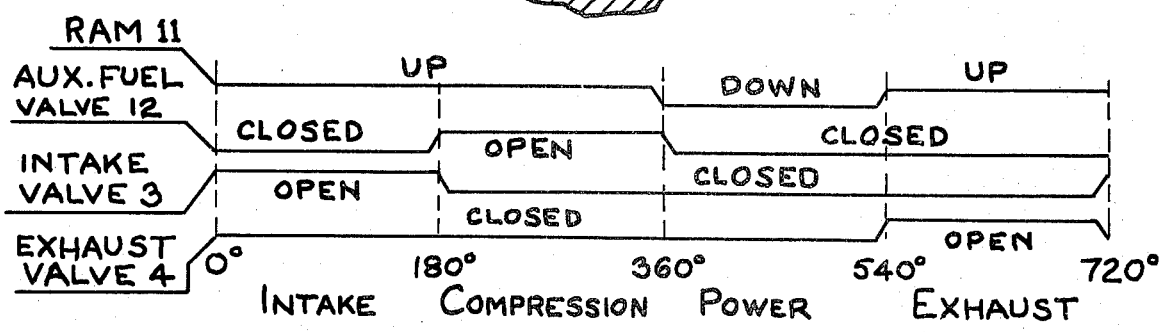
FIG. 2 is a timing diagram.

For the single cylinder shown in FIG. 1, a timing diagram is shown in FIG. 2. The operation will be described in connection with FIG. 2. Zero degrees of revolution of the crankshaft is taken as being top dead center on the intake stroke, in the usual Otto cycle engine. At 0°, the exhaust valve is closed and the intake valve has just opened. The auxiliary fuel injector valve 12 is closed, and the igniter ram or piston 9, 11, is up, in the position shown in FIG. 1. On the engine intake stroke, a charge of lean air/fuel mixture is drawn into the main combustion chamber 20 through intake valve 3. At the end of the intake stroke, shown at 180° in FIG. 2, the auxiliary fuel valve 12 opens and intake valve 3 closes. The piston or ram 9, 11, remains up. A small charge of auxiliary fuel enters the ram igniter chamber 18 under fuel line pressure via valve 12 and port 28.

The engine compression stroke now begins and as the main charge of lean air/fuel mixture is compressed in the main combustion chamber 20, a small amount of this charge is forced up through orifice 19, into the ram ignition chamber 18, where it thoroughly mixes with the auxiliary fuel which is now entering through the auxiliary fuel valve 12 and port 28.

At the beginning of the power stroke, at 360°, the igniter solenoid coil 8 is energized, forcing the piston or ram 9, 11, down very rapidly, closing off the port 28 to the auxiliary fuel valve 12 and also the exhaust port 25, and compressing the small charge of auxiliary fuel and air in the igniter chamber 18. The speed of ram actuation and the area of the orifice 19 are proportioned so that the loss of pressure due to a portion of this auxiliary charge escaping through the orifice 19 is small. The small amount which does pass through that orifice is now reversed in direction from the upward flow which occurred during the engine compression stroke; it now rapidly passes from the auxiliary igniter chamber 18 into the main combustion chamber 20 and forms a high velocity jet of atomized auxiliary air/fuel mixture in this chamber. As the auxiliary igniter piston or ram 9, 11, continues to compress the air/fuel mixture in the auxiliary combustion chamber 18, ignition temperature is reached near the end of the ram or piston travel and the resulting flame spurts down through the orifice 19 into the main combustion chamber 20 of cylinder 1, igniting the atomized jet of auxiliary fuel which preceded it through orifice 19; the shaped flame front of this jet progressively ignites the lean main fuel charge in combustion chamber 20.

During the power stroke the piston or ram 9, 11, remains down. The bottom of ram 11 is preferably flat, and the inner end surface of the igniter chamber 18, adjacent to the orifice 19, is preferably also flat or of a contour substantially matching that of the ram. Hence when the piston or ram 9, 11, is all the way down, only that portion of its area opposite the orifice 19 is exposed to pressure from the main combustion chamber 20. Accordingly, the force required to hold the ram-piston 11 down is relatively small during the remainder of the engine power stroke after the igniter has performed its function of igniting the main charge in the engine combustion chamber 20.

At the end of the engine power stroke, at 540° in FIG. 2, the exhaust stroke begins. The solenoid 8 is de-energized, and the return spring 10 draws the igniter ram 11 back up into the position shown in FIG. 1. The auxiliary fuel valve 12 remains closed. The exhaust valve 4 opens, and the intake valve 3 remains closed in the usual manner. A small portion of engine exhaust leaks back through orifice 19 into the auxiliary ram chamber 18 from which it is vented into the engine exhaust system through port 25 and tube 26. This completes the four stroke cycle.

Referring now to FIGS. 3A, 3B, and 3C, three different configurations are shown for the orifice 19 within the purview of the invention. FIG. 3C shows a straight orifice 19C similar to the ignition chamber orifices shown at 19 in FIGS. 1 and 4A. FIG. 3A shows a conical orifice 19A, shaped to present less viscous drag to heavier auxiliary fuels. FIG. 3B shows an orifice 19B in the shape of a modified Galton ultrasonic whistle capable of generating appreciable amounts of ultrasonic energy e.g., in excess of 10 watts in the usage shown. Here, the air/fuel mixture passing through the orifice 19B, at high velocity because of the rapid action of the ram, is forced into ultrasonic oscillation, thus providing a substantial degree of dispersion and atomization, before and after ignition, of the fuel and subsequent flame in the main combustion chamber 20.

The Galton whistle is a known type of ultrasonic sound generator once common in physics laboratories, and is described for example on pages 1-3 of the book, "Ultrasonics and its Applications" by Ludwig Bergmann, trans. by H. S. Hatfield (John Wiley, New York, 1938). Like other types of whistles it comprises a resonants cavity and a "knife edge" or lip portion adjacent a gas stream. In the Galton whistle and in the present invention the lip is circular, as indicated at 191, FIGS. 3B and 8. The present cavity 192 is annular in shape.

Referring now to FIG. 4A, a suitable construction of auxiliary fuel injector valve 12 is shown in operative relation to an igniter 6 of the invention. The injector valve 12 may comprise a suitable ferromagnetic body portion 46, a ferromagnetic core 47, a coil 48, and a ferromagnetic armature or plunger 41. The core 47 is hollow, and connects with the auxiliary fuel supply tube 23. The plunger 41 is bored auxiliary at 42; the axial bore extending part way along it and then connecting with the surrounding space through one or more lateral holes 44. Portion 49 of the plunger 41 is a close fit in the surrounding bore, as shown in the sectional view of FIG. 4B. A lower portion 50 has a triangular or other suitable cutaway section, as shown in the sectional view of FIG. 4C. The auxiliary fuel may thus pass from the supply line or tube 23, down the plunger bore 42, out through the lateral hole 44, and past the section 50 into the space surrounding the lower end portion of the plunger. This end portion is provided with a needle-like tip 45 which seals the small hole through which it protrudes when the plunger is down. When the magnet coil 48 is energized via wires 21, the plunger 41 is drawn upward, and its tip 45 is withdrawn from the hole, permitting auxiliary fuel to be squirted into the auxiliary ignition chamber 18, under fuel line pressure. The action is rapid; the total travel of the plunger may typically be of the order of 0.3 mm (0.012 inch).

Referring now to FIG. 5, an electrical schematic diagram is shown of a system for controlling the ram compression igniters and auxiliary fuel valves for a four cylinder engine, according to the invention. The function of this circuitry is to program the operation of the rams 7 and the auxiliary fuel valves 12 according to the timing diagram of FIG. 2, for a four-cylinder Otto-cycle engine having the firing order 1 - 3 - 4 - 2.

This system comprises a low-tension distributor or switch 15a, a set of four solenoid driver units each designated 17 for simplicity, suitable current limiting resistors 51, 53, and pulse shaping storage capacitors 52, 54, connected so as to energize the solenoids of the igniter rams 9 in igniters 6, and the auxiliary fuel valves 12, of the invention, in the following order:

| Distributor 15a - segment no. | Igniter 6 - cyl. no. | Auxiliary fuel valve 12 - cyl. no. |
| --- | --- | --- |
| 1 | 1 | 3 |
| 3 | 3 | 4 |
| 4 | 4 | 2 |
| 2 | 2 | 1 |

The stationary contacts or segments of the distributor 15a are numbered #2, #2, etc. on the drawing FIG. 5, in correspondence with the number off he engine cylinder that each one fires.

The solenoid driver units or circuits 17 are all alike, one for each cylinder of the engine. They may suitably comprise a high-current Darlington transistor pair 55a, 55b, connected in the conventional manner with suitable inductive spike protection by diodes and Zener diodes 56, 57, etc. When the rotating arm 150 of the distributor is in contact with segment #1, it applies a portion of the voltage of the main battery 69 e.g., 4 volts, as determined by voltage divider resistors 57, 58, via terminal B to the base of transistor 55a, turning it and the output transistor 55b "on" into the saturated state. A similar action occurs as arm 150 contacts the other segments in progression. As arm 150 leaves each segment, resistor 60 restores terminal B to ground, turning "off" the transistor switch 55b. Resistor 60 is preferably of such high value e.g., 50,000 ohms, that its shunting effect on the voltage dividers 57, 58, is negligible.

To obtain high peak current through the solenoid coil 8 of igniter 6 (FIG. 1), a known type of pulse shaping capacitor discharge circuits 51, 52 may be employed. One side of capacitor 52 is grounded, and the other side may be counted to the "high" side of battery 69 or other power source through a resistor 51. Saturation of the power transistor 55b provides a low-resistance conductive path from terminals C (collector) to E (emitter) of solenoid driver 17 and thus connects coil 8 of the igniter 6 directly across the capacitor 52 which discharges a high-energy pulse directly into the coil; following the discharge of the stored energy in the capacitor, the solenoid coil 8 remains partially energized through resistor 51 (which now acts as a current limiter) thus holding the igniter ram-piston down for the duration of the engine power stroke. As the duty-cycle "on" time of each igniter is about 25%, which corresponds with te power stroke of the Otto cycle (modified by slight overlap), capacitor 52 has sufficient time to recharge to full source voltage through resistor 51 during the remaining "off" portion of the duty-cycle.

The same drivers or electronic switch units 17 also drive the magnet coils in the auxiliary fuel valves 12, in a similar manner, utilizing capacitors 54 and current limiting resistors 53, but as tere is no "ram" action required, peak power demands are lower. Heat dissipation is minimized in the transistors by operating them in the switching mode e.g., full "on" and "off".

As is evident from the table given above which shows the distribution of the energization of the igniters and auxiliary fuel valves for FIG. 5, the distributor 15a needs only one set of stationary contacts or segments for a four-cylinder engine.

For larger numbers of cylinders, a slightly more complex arrangement of contacts is required, due to the fact that only in the four-cylinder engine does the firing interval of 180° coincide with the Otto cycle stroke of 180°. For engines of more than four cylinders, overlap occurs because two engine cylinders must be on the same Otto cycle phase or stroke simultaneously. This overlap is depicted in FIG. 6 and FIG. 7, in which it may be seen that the Otto cycle stroke remains at 180° (shown as 90° on the physical sector as the distributor turns at one-half engine speed) whereas the cylinder firing interval is 720°/N where N is the number of cylinders. Thus for a six-cylinder engine the firing interval is 120° (shown as 60° on the drawing FIG. 6) and the overlap is 60° (30° on FIG. 6). Similarly, it may be shown that for the eight-cylinder engine the overlap is 90° (45° on FIG. 7). From this inherent overlap which exists in engines of more than four cylinders, it follows that the switching function must also overlap and for this reason a dual row of contact segments, suitably overlapped, is required for these engines. This overlap creates no problem in programming; the actuation of the ram of any igniter blocks the auxiliary fuel inlet port 28 (FIG. 1) of that igniter, thus shutting off the auxiliary fuel even though the auxiliary fuel valve is being held open by the distributor arm remaining in contact with the overlapping portion of the previously fired cylinder segment.

In FIG. 6, a distributor 15b is shown schematically which is suitable for a six-cylinder engine. Assuming a firing order of 1 – 5 – 3 – 6 – 2 – 4, the following table shows the order in which the igniters and the auxiliary fuel valves are energized:

| Distributor 15b - segment no. | Igniter 6 - cyl. no | Auxiliary fuel valve 12 - cyl. no. |
|---|---|---|
| 61 | 1 | 5 |
| 62 | 5 | 3 |
| 63 | 3 | 6 |
| 64 | 6 | 2 |
| 65 | 2 | 4 |
| 66 | 4 | 1 |

Similarly, for an eight-cylinder engine having the firing order 1 – 5 – 4 – 2 – 6 – 3 – 7 – 8, the distributor schematic may be as in FIG. 7, for which the corresponding table would be:

| Distributor 15c - segment no. | Igniter 6 - cyl. no. | Auxiliary fuel valve 12 - cyl. no. |
|---|---|---|
| 71 | 1 | 5 |
| 72 | 5 | 4 |
| 73 | 4 | 2 |
| 74 | 2 | 6 |
| 75 | 6 | 3 |
| 76 | 3 | 7 |
| 77 | 7 | 8 |
| 78 | 8 | 1 |

It is considered unnecessary to show the complete diagram similar to FIG. 5 for the above six and eight-cylinder examples. The electronic switch or driver units 17, the resistors 51, 53, 60, and the capacitors 52, 54, would all be duplicated for each of the cylinders, as before.

The ram compression igniter means of the invention may be used on engines or more than eight cylinders by similarly increasing the number of basic elements associated with each engine cylinder, as above.

Referring again to FIG. 5, the segmented contact plate section of the low-tension distributor/programmer 15a may be mounted on the original distributor in place of the plate which formerly held the breaker points (no longer required) and therefore it may be advanced or retarded by manifold vacuum and/or centrifugal (speed monitoring) means in the same manner as the original high-tension distributor. This allows compensation for variable speed and load conditions and their respective effects on the inertial response of the fuel and electro-mechanical elements. The modulating control is shown generally as box 59 in FIG. 5.

FIG. 8 shows a modification of the igniter 6 (FIG. 1) of the invention, in which a glow plug is installed adjacent to the delivery end of the orifice 19, in order to permit the use of lower grade e.g., higher flash-point, auxiliary fuels. The orifice shown in FIG. 8 is the ultrasonic version also shown as 19B in FIG. 3B. The glow plug element 80 (FIG. 8) may comprise a coil of 3 or more turns of refractory wire such as tungsten mounted in a protuberance 81 which extends below the bottom face of igniter 6. The turns of high-temperature wire 83 which comprise the element 80 may be formed in a small coil whose inner diameter is the same or preferably slightly larger than the diameter of the lower exit end of the igniter orifice 19B. The end of the bottom turn of the element coil may be spot-welded to protuberance 81, thus providing a ground circuit return path for the glow plug element energy source. The upper turn of element 80 extends as wire 84 in groove 82 to a suitable source of glow plug energization. Wire 84 and the glow plug element may be insulated and supported in the protuberance 81 and in the groove 82 with a suitable high-temperature ceramic cement.

I claim:
1. An internal combustion engine comprising a main combustion chamber, means to supply a main charge of a lean fuel-air mixture thereto, and
   an ignition system comprising
   an igniter, a source of auxiliary igniter fuel and air, feed means to feed an igniter charge thereof to said igniter, and control means connected to said feed means and igniter;
   said igniter comprising
   a small cylinder-like igniter chamber, a piston-like ram slidable therein to reduce its volume by a large factor,
   a permanently-open orifice extending from a bottom orifice end of said igniter chamber directly into said main combustion chamber and having a diameter greater than about one-third its length,
   and electromagnetic ram driving means disposed to drive said ram rapidly down to said bottom orifice end in less than about three milliseconds to compress said igniter charge adiabatically to ignition temperature to form a jet of flame spurting out through said orifice to ignite said main charge.

2. An engine as in claim 1, wherein said ram driving means comprises an electrical solenoid, at least a portion of said ram constituting the magnetically-driven core thereof.

3. A system as in claim 2, wherein said control means comprises:
   a low-tension rotary switching distributor means, and a solid-state electronic high-current switch means, one said switch means being supplied for each cylinder of said engine and drivably connected to each said solenoid, and connections from said distributor means to each of said switch means.

4. An engine as in claim 3, wherein said feed means comprises an auxiliary fuel pump having an inlet connected to said source, an outlet, and an electromagnetically-actuated fuel valve and a line connecting it to said outlet, said valve having a discharge side opening into a passage leading into said igniter chamber, and said pump having pressure regulating means limiting its delivery pressure to less than about 7 kg per square cm.

5. A engine as in claim 4, wherein said engine has more than four cylinders and said distributor means is provided with two sets of stationary contacts each contacted by a common rotating wiper arm, one of said sets being staggered with respect to the other set according to the firing interval overlap of the engine.

6. An engine as in claim 4, wherein:

said engine has four cylinders and a said igniter and fuel valve operatively connected to each cylinder, said distributor means has one rotating contact and four stationary contacts, and electrical control paths are disposed from each said stationary contact both to a said solenoid and a said fuel valve, each said fuel valve being disposed in operative relation to a cylinder one step earlier in the firing order than the said solenoid.

7. A system as in claim 1, wherein:

said orifice diverges in cross-section toward said main combustion chamber.

8. An engine as in claim 1, further comprising:

glow-plug means comprising a coil of refractory wire disposed adjacent to the outlet portion of said orifice, and electrical means to heat said glow-plug means.

9. An engine as in claim 1, wherein:

said orifice is provided with an internal circumferential groove defining an annular cavity, an edge of said cavity defining a circular lip portion, said cavity and lip portion cooperating to impart oscillations to the gas in said jet of flame passing through said orifice, in the manner of a modified Galton whistle, whereby said flame is dispersed in said main combustion chamber to provide progressive ignition of said main charge.

10. An engine as in claim 1, wherein:

said ram has a substantially flat ram face of an area substantially greater than the area of said orifice, and sad igniter chamber has a substantially flat matching surface at its inner bottom orifice end, said face and surface being substantially in contact at the downward end of the stroke of said ram, whereby said ram face at said end of said stroke is exposed to pressure from said main combustion chamber only over a portion of its area approximating the area of said orifice, to reduce the force required of said ram driving means to hold said ram down during the power stroke.

11. An engine as in claim 1, wherein:

said orifice is provided with an internal portion defining an acoustically resonant cavity, a portion of said cavity defining a lip portion, said cavity and lip portion cooperating to define the components of a high-frequency whistle, said whistle imparting oscillations to the gas in said jet of flame passing through said orifice, whereby said flame is dispersed in said main combustion chamber to provide progressive ignition of said main charge.

* * * * *